(12) United States Patent
Saito et al.

(10) Patent No.: US 12,529,656 B2
(45) Date of Patent: Jan. 20, 2026

(54) BIOMOLECULAR ANALYSIS METHOD AND BIOMOLECULAR ANALYZER

(71) Applicants: Hitachi High-Tech Corporation, Tokyo (JP); Roche Diagnostics Operations, Inc., Indianapolis, IN (US)

(72) Inventors: Toshiro Saito, Tokyo (JP); Kyoko Imai, Tokyo (JP); Francesco Paolucci, Bologna (IT); Massimo Marcaccio, Bologna (IT); Giovanni Valenti, Bologna (IT); Alessandra Zanut, Bologna (IT); Michaela Windfuhr, Mannheim (DE); Hans-Peter Josel, Mannheim (DE)

(73) Assignees: HITACHI HIGH-TECH CORPORATION, Tokyo (JP); ROCHE DIAGNOSTICS OPERATIONS, INC.

( * ) Notice: Subject to any disclaimer, the term of this patent is extended or adjusted under 35 U.S.C. 154(b) by 1009 days.

(21) Appl. No.: 17/631,061

(22) PCT Filed: Jul. 31, 2019

(86) PCT No.: PCT/JP2019/030018
§ 371 (c)(1),
(2) Date: Jan. 28, 2022

(87) PCT Pub. No.: WO2021/019732
PCT Pub. Date: Feb. 4, 2021

(65) Prior Publication Data
US 2022/0283094 A1 Sep. 8, 2022

(51) Int. Cl.
*G01N 21/66* (2006.01)
*B01L 3/00* (2006.01)
*G01N 33/543* (2006.01)

(52) U.S. Cl.
CPC ........ *G01N 21/66* (2013.01); *B01L 3/502761* (2013.01); *G01N 33/54333* (2013.01);
(Continued)

(58) Field of Classification Search
None
See application file for complete search history.

(56) References Cited

U.S. PATENT DOCUMENTS

| 2006/0078912 A1 | 4/2006 | Bard et al. |
| 2007/0116600 A1 | 5/2007 | Kochar et al. |

(Continued)

FOREIGN PATENT DOCUMENTS

| JP | 04-502964 A | 5/1990 |
| JP | 2008-504528 A | 2/2008 |

(Continued)

OTHER PUBLICATIONS

Wujian Miao, Jai-Pil Choi, and Allen J. Bard, "The Tris(2,2'-bipyridine)ruthenium(II), (Ru(bpy)3^2+)/Tri-n-propylamine (TPrA) System Revisited—A New Route Involving TPrA-+ Cation Radicals", Journal of American Chemical Society 124(48), (2002), pp. 14478-14485.

(Continued)

*Primary Examiner* — Rebecca M Giere
(74) *Attorney, Agent, or Firm* — Volpe Koenig (57) ABSTRACT

An analysis method includes: an inflow process of a solution containing a test object, a magnetic support on the surface of which a complex including an antibody labeled with a luminescent agent and recognizes the test object is formed, and a reaction aid to assist reaction of the luminescent agent in a flow cell; a process of capturing the magnetic support over a working electrode by a magnetic field; a process of making the luminescent agent illuminate by applying a voltage to the working electrode; and a process of measuring (Continued)

an amount of luminescence of the luminescent agent. The luminescent process includes: luminescence from action of a first neutral radical, produced from the reaction aid through a cation radical; and luminescence from action of a second neutral radical, produced not through a cation radical, on the luminescent agent. This increases the luminous efficiency of ECL and enhances detection sensitivity.

13 Claims, 7 Drawing Sheets

(52) U.S. Cl.
CPC .................. *B01L 2200/0668* (2013.01); *B01L 2300/0636* (2013.01); *B01L 2300/0645* (2013.01)

(56) References Cited

U.S. PATENT DOCUMENTS

| | | |
|---|---|---|
| 2013/0224758 A1 | 8/2013 | Finke et al. |
| 2016/0097765 A1 | 4/2016 | Kraus et al. |
| 2018/0348140 A1 | 12/2018 | Quint et al. |
| 2018/0364175 A1 | 12/2018 | Josel et al. |

FOREIGN PATENT DOCUMENTS

| | | |
|---|---|---|
| JP | 2009-139308 A | 6/2009 |
| JP | 2013-542436 A | 11/2013 |
| JP | 2016-522417 A | 7/2016 |
| JP | 2019-512665 A | 5/2019 |
| JP | 2019-515251 A | 6/2019 |
| WO | 2007/002580 A2 | 1/2007 |
| WO | 2007/005626 A1 | 1/2007 |
| WO | WO 2017/153574 A1 * | 9/2017 |

OTHER PUBLICATIONS

International Search Report, PCT/JP2019/030018, Oct. 15, 2019, 2 pgs.

Sentic, M., "Mapping electrogenerated chemiluminescence reactivity in space: mechanistic insight into model systems used in immunoassays", Article, Royal Society of Chemistry, London, UK. (2014).

Extended European Search Report dated Dec. 21, 2022 for European Patent Application No. 19939057.6.

* cited by examiner

BIOMOLECULAR ANALYSIS METHOD AND BIOMOLECULAR ANALYZER

TECHNICAL FIELD

The present invention relates to a biomolecular analysis method and a biomolecular analyzer.

BACKGROUND ART

In recent years, a biomolecular analysis method based on an electrochemiluminescence (ECL: Electrogenerated Chemi Luminescence) method has been developed. The ECL method is a method of: generating a radical species of a reaction aid by putting a solution containing the reaction aid such as amine and a luminescent material such as a ruthenium complex in a flow cell having a working electrode, a counter electrode, and a reference electrode and applying a potential not lower than the oxidation potential of the reaction aid; forming an excited state of the luminescent material by reaction between the radical species and the luminescent material; and measuring the luminescence.

As a method related to such an ECL method for example, Patent Literature 1 discloses a technology of: forming a sandwich complex including a luminescent material modified antibody and analysis target molecules over a support comprising magnetic microparticles or the like; fixing the sandwich complex to an electrode by an external force such as a magnetic field; then generating ECL by applying a voltage; and estimating the concentration of the analysis target molecules by measuring an ECL intensity that depends on the concentration of the analysis target molecules.

Meanwhile, Nonpatent Literature 1 discloses a mechanism of generating ECL with regard to a system of using tripropylamine (TPrA) as a reaction aid and a ruthenium bipyridyl complex as a luminescent material.

CITATION LIST

Patent Literature

Patent Literature 1: Japanese Unexamined Patent Application Publication No. Hei 4(1992)-502964

Nonpatent Literature

Nonpatent Literature 1: Wujian Miao, Jai-Pil Choi, and Allen J. Bard, "The Tris(2,2'-bipyridine)ruthenium(II), (Ru(bpy)3^2+)/Tri-n-propylamine (TPrA) System Revisited—A New Route Involving TPrA·+ Cation Radicals", Journal of American Chemical Society 124 (48), (2002), pp 14478-14485

SUMMARY OF INVENTION

Technical Problem

A biomolecular analysis method based on an ECL method is researched actively in order to be used for the quantification of blood markers for the early diagnosis of cancer or heart disease, and is being applied to clinical diagnosis partially. In such a field, further enhanced detection sensitivity is required.

The present invention has been established in view of the above situation and an object of the present invention is to provide a biomolecular analysis method and a biomolecular analyzer which are capable of enhancing detection sensitivity by increasing the luminous efficiency of ECL.

Solution to Problem

The present application includes a plurality of means for solving the above problem and an example of the means is a biomolecular analysis method including: an inflow process of causing to flow in a flow cell, a solution containing a test object, a magnetic support on the surface of which a complex including an antibody that is labeled with a luminescent agent and recognizes the test object is formed, and a reaction aid to assist reaction of the luminescent agent; a capture process of capturing the magnetic support over a working electrode by a magnetic field generated by a magnetic force generator; a luminescent process of making the luminescent agent illuminate by applying a voltage to the working electrode; and a measurement process of measuring an amount of luminescence of the luminescent agent. The luminescent process includes: luminescence caused by action of a first neutral radical, which is produced from the reaction aid through a cation radical, on the luminescent agent; and luminescence caused by action of a second neutral radical, which is produced not through a cation radical, on the luminescent agent.

Advantageous Effects of Invention

Detection sensitivity can be enhanced by increasing the luminous efficiency of ECL.

DESCRIPTION OF EMBODIMENTS

Embodiments according to the present invention are explained hereunder in reference to drawings.

First Embodiment

First Embodiment is explained hereunder in detail in reference to FIGS. 1 to 9.

Figure 1:
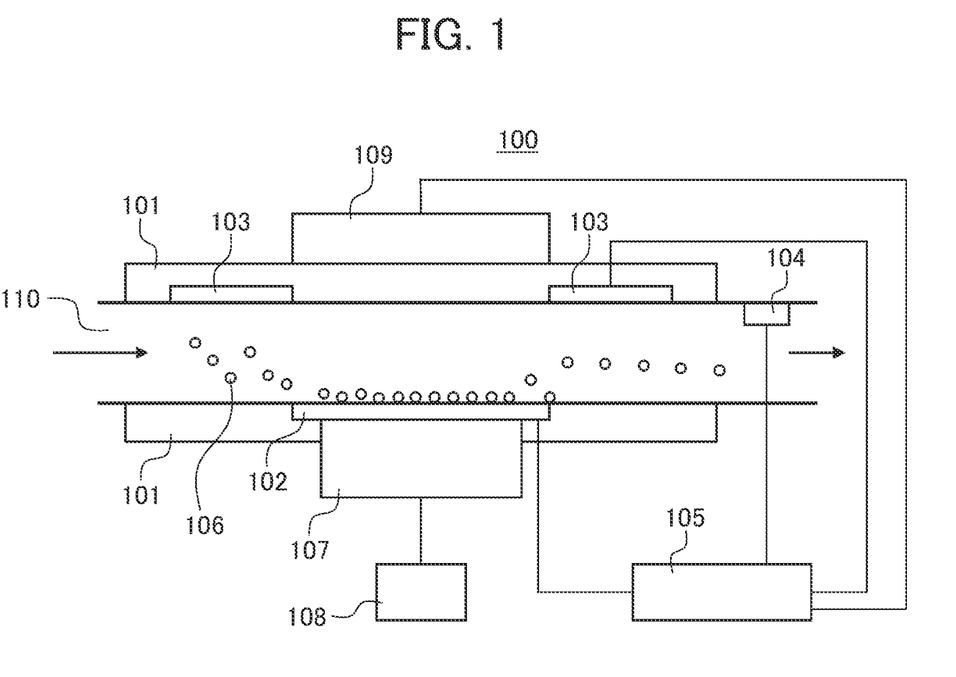
FIG. 1 is a view extracting and schematically showing a substantial part of a biomolecular analyzer according to First Embodiment.

FIG. 1 is a view extracting and schematically showing a substantial part of a biomolecular analyzer according to the present embodiment.

In FIG. 1, a biomolecular analyzer 100 has: a flow cell 101; a working electrode 102, a counter electrode 103, and a reference electrode 104 which are arranged in the interior of the flow cell 101; and a controller 105 carrying out analysis processing of making a solution (described later in detail) containing a test object, magnetic beads 106 (a magnetic support) over the surfaces of which a complex including an antibody that is labeled with a luminescent agent and recognizes the test object is formed, and a reaction aid to assist reaction of the luminescent agent is made to flow into a flow channel 110 of the flow cell 101, capturing the magnetic beads 106 over the working electrode 102 by a magnetic field generated by a magnet 107 (magnetic force generator) that is shifted to the vicinities of the flow cell 101 and the working electrode 102 by a magnet position controller 108, making the luminescent agent to illuminate by applying a voltage at the working electrode 102 by the controller 105, and measuring an amount of luminescence of the luminescent agent by an electrochemiluminescence detector 109. The controller 105 is a device that controls the overall behavior of the biomolecular analyzer 100, carries out the control of the position of the magnet 107 by the magnet position controller 108, controls the voltages applied to respective electrodes acting as a potentiostat (voltage controller), controls the analysis processing of a detection result of the electrochemiluminescence detector 109, and others.

The present embodiment analyzes biomolecules in a specimen by carrying out capturing and labeling by using immune recognition, and explains particularly basing on the use of magnetic microparticles as a support for a sandwich complex formed by the immune recognition. By using magnetic microparticles as a support like the present embodiment, it is possible to: magnetically separate a reactant and an unreacted material; and carry out high-speed and high-sensitivity analysis.

On this occasion, a sandwich complex comprising a capture antibody that links the magnetic microparticles with the target analytical biomolecules, the biomolecules, a detection antibody that linked to the label material that link the biomolecules. The resulting sandwich complex is fixed to the magnetic microparticles. The magnetic microparticles are captured on an electrode by an external magnetic force or the like. As a result, a label material such as a ruthenium bipyridyl complex is not directly oxidized or reduced by the electrode. A so-called reaction aid that is oxidized or reduced by the electrode and reflects the influence to the label material therefore is required. In the present embodiment, an active species of a label material is formed by using tripropylamine (TPrA) as the reaction aid and making a radical species of the reaction aid formed over the electrode surface react with the label material and electrochemiluminescence (ECL: Electrogenerated Chemi Luminescence) is generated during deactivation processing.

Firstly, the basic principle of electrochemiluminescence (ECL: Electrogenerated Chemi Luminescence) generation in the present embodiment is explained.

Figure 2:
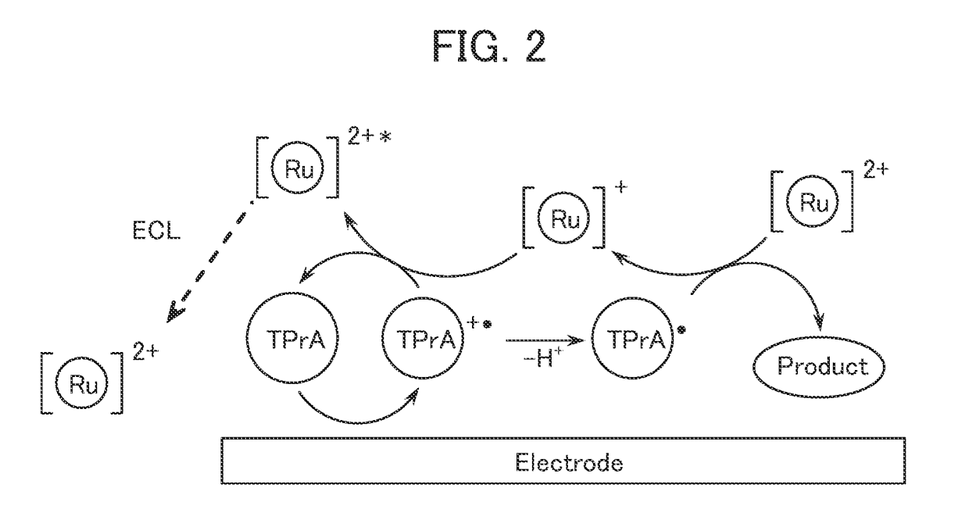
FIG. 2 is a view explaining the basic principle of electrochemiluminescence.

FIG. 2 is a view explaining the basic principle of electrochemiluminescence (ECL) generation.

FIG. 2 shows a system of using tripropylamine (TPrA) as a reaction aid and a ruthenium bipyridyl complex (Ru) as a luminescent material.

In FIG. 2, firstly TPrA is oxidized over an electrode and a TPrA cation radical is generated. Successively, a TPrA radical (neutral) is generated by proton abstraction reaction of the TPrA cation radical. A ruthenium bipyridyl complex (2+) and the TPrA radical (neutral) react and a ruthenium bipyridyl complex (1+) is generated. Further, an excited state of the ruthenium bipyridyl complex (2+) is formed by the reaction of the TPrA cation radical and the ruthenium bipyridyl complex (1+) and ECL is generated when the ruthenium bipyridyl complex (2+) illuminates.

It is thought that: the luminous efficiency of ECL is related to the probability of radical species reaching a ruthenium complex over magnetic microparticles within the lifetime of the radical species in a reaction aid; and the luminous efficiency can be enhanced by increasing the reaching probability. In studying a method of increasing a luminous probability therefore, firstly the following verification is carried out in order to obtain a relationship between a diameter of magnetic microparticles and a luminescence intensity of ECL.

Figure 3:
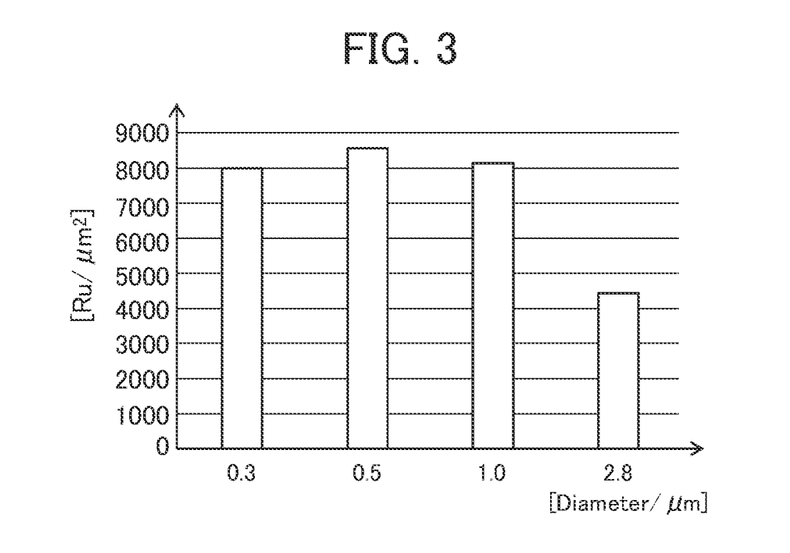
FIG. 3 is a graph showing a relationship between a diameter of magnetic microparticles and a number of ruthenium complex molecules per unit surface area.

FIG. 3 is a graph showing a relationship between a diameter of magnetic microparticles and a number of ruthenium complex molecules per unit surface area.

In obtaining the relationship of FIG. 3, firstly magnetic microparticles, the surfaces of which are coated with streptavidin, 2.8 µm in diameter (Dynabeads M-270 Streptavidin made by Thermo Fisher Scientific), 1 µm in diameter (Dynabeads MyOne Streptavidin T1 made by Thermo Fisher Scientific), 0.5 µm in diameter (Bio-MasterBeads Streptavidin 500 nm made by ADEMTECH), and 0.3 µm in diameter (Bio-Adembeads Streptavidin 300 nm made by ADEMTECH) are prepared. Further, a biotinylated antibody labeled with a ruthenium bipyridyl complex is manufactured by modifying an antibody (ab403 made by Abcam) with biotin of Biotin Labeling Kit-SH made by DOJINDO LABORATORIES and then making the antibody react with ruthenium bipyridyl complex labeled molecules (bis(2,2'-bipyridine)-4'-methyl-4-carboxybipyridine-ruthenium N-succinimidyl ester-bis(hexafluorophosphate)) made by Sigma-Aldrich). By making the biotinylated antibody labeled with the ruthenium bipyridyl complex react with the magnetic microparticles coated with streptavidin, magnetic microparticles of respective sizes to which the ruthenium bipyridyl complex is fixed are obtained.

A quantity of a ruthenium complex over magnetic microparticles is determined with an inductively coupled plasma mass spectrometer. A specimen is prepared by adding a nitric acid/hydrochloric acid mixed solution to a predetermined quantity of a magnetic microparticle dispersing liquid and dissolving magnetic microparticles with an acid digestion system at 80° C. An internal standard method is adopted as measurement method using the mass spectrometer and Y (20 ng/ml) is used as an internal standard element. As a concentration of the magnetic microparticles, a value stated in a data sheet provided by each maker is adopted. From those values, the relationship shown in FIG. 3 is obtained.

Figure 4:
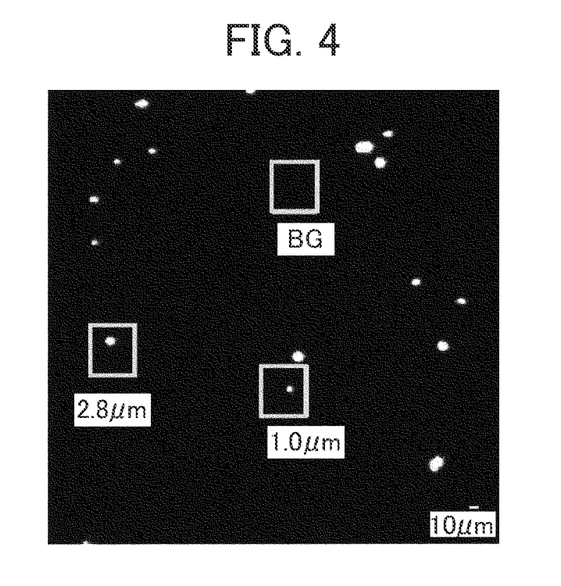
FIG. 4 is a view showing an example of observing luminescence intensity of ECL.
Figure 5:
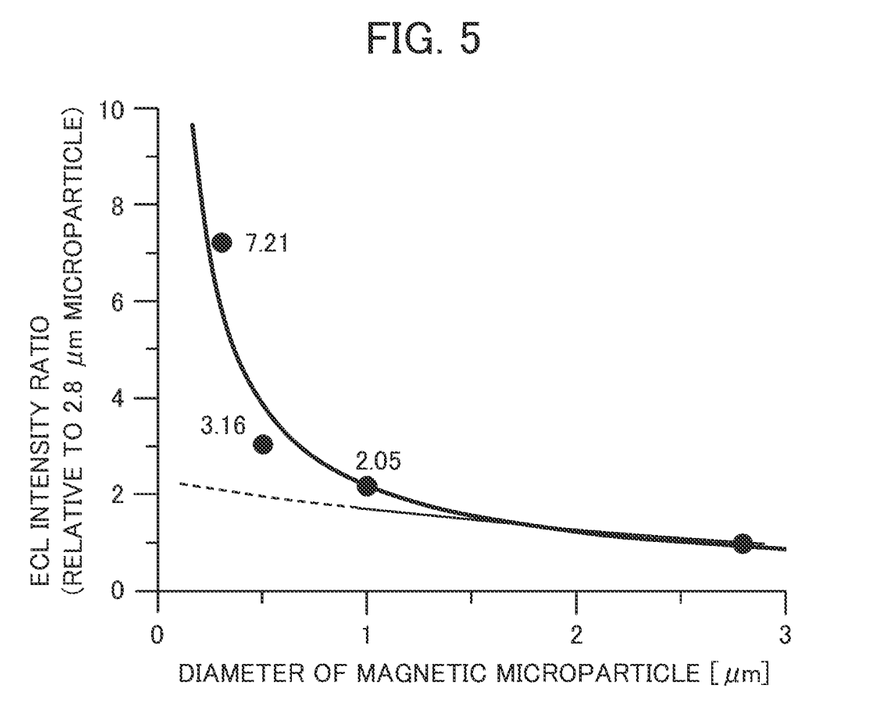
FIG. 5 is a graph showing a relationship between a diameter of magnetic particles and a luminescence intensity of ECL.

FIG. 4 is a view showing an example of observing luminescence intensity of ECL. Further, FIG. 5 is a graph showing a relationship between a diameter of magnetic particles and a luminescence intensity of ECL.

In the measurement of a luminescence intensity of ECL, the luminescence intensity of every single magnetic microparticle is measured for the reasons that: if magnetic microparticles are observed as a group, the magnetic microparticles overlap with each other and are fixed to a substrate and that affects a luminescence intensity; a luminescence intensity depends largely on the number of magnetic microparticles over a substrate and the number is hardly grasped precisely and corrected.

Specifically, a flow cell in which a working electrode, a counter electrode, and a reference electrode (Ag/AgCl) are arranged at a distance of 0.5 mm between electrodes is prepared and filled with a solution containing magnetic microparticles of respective sizes (diameters) to which a ruthenium bipyridyl complex is fixed. In order to measure luminescence emitted from magnetic microparticles of different sizes under the same conditions, the flow cell is filled with a pair of magnetic microparticles 2.8 µm and 0.3 µm in diameter, a pair of magnetic microparticles 2.8 µm and 0.5 µm in diameter, and a pair of magnetic microparticles 2.8 µm and 1 µm in diameter respectively and differences in luminescence intensity between two sizes in the respective pairs are measured. In the measurement, the flow cell is placed under a microscope, luminescence is collected with an objective lens (×100), and then a luminescent image is obtained with an EM-CCD (Electro Multiplying Charge Coupled Device, 9100-13, made by Hamamatsu Photonics K.K.). An image of observing magnetic microparticles 2.8 µm and 1 µm in diameter is shown in FIG. 4 as an example. Image processing software ImageJ is used for numerical processing, an integrated value of intensities per pixel in a certain area surrounding a bright spot is obtained, and a signal value is calculated by subtracting the region where the bright spot does not exist as a background (BG).

Further, a rate of a signal value to a number of ruthenium complex molecules is calculated and further a ratio of the rate to the rate of the magnetic microparticle 2.8 µm in diameter is obtained. As shown in FIG. 5, the ECL efficiency increases significantly as the diameter of a magnetic microparticle reduces and the ECL efficiency is about twice in the case of 1.0 µm and about seven times in the case of 0.3 µm in diameter in comparison with the case of 2.8 µm in diameter. It has therefore been found that ECL can be increased and luminous efficiency can be enhanced by reducing the diameter of a magnetic microparticle used as a support. In particular, a higher luminous efficiency can be expected by using a magnetic microparticle 1 µm or lower in diameter.

In FIG. 5, as an example comparable to the verification result according to the present embodiment, the relationship between a microelectrode-substrate (to which a ruthenium complex is fixed) distance and an ECL intensity in prior art (Nonpatent Literature 1) is represented by the solid line and the relationship estimated in the range of the distance of 1 µm or lower is represented by the extrapolation line (dotted line).

As it is obvious from FIG. 5, in the present embodiment, significantly unlike the results estimated from prior art, ECL efficiency improves largely as a distance between a ruthenium complex and an electrode reduces to 1 µm or lower. It shows, in other words, that ECL efficiency can improve far better by using a magnetic microparticle of 1 µm or lower in diameter.

Further, in order to verify the effect of downsizing a magnetic microparticle here, the relationship between a distance between a microelectrode and a substrate to which a ruthenium complex is fixed and an ECL intensity is investigated by using a micromanipulator positioned in the proximity of an emitting surface.

Figure 6:
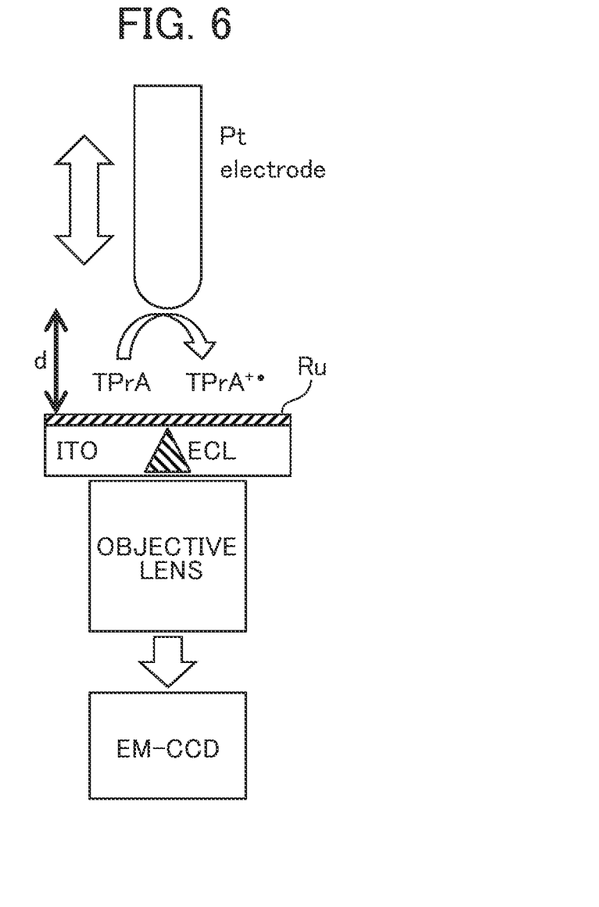
FIG. 6 is a view showing a measurement system used for investigating a relationship between a distance between a microelectrode and a surface to which a luminescence unit is fixed and an ECL intensity.

FIG. 6 is a view showing a measurement system used for investigating a relationship between a distance between a microelectrode and a substrate to which a ruthenium complex is fixed and an ECL intensity.

As shown in FIG. 6, a micromanipulator(Scanning electrochemical microscopy SECM: CHI910B, made by CH Instruments, Inc.) is used as the measurement system, a platinum wire (Pt electrode) of 1.3 mm in diameter is used as the working electrode, a platinum wire is used as the counter electrode, and Ag/AgCl (3M) is used as the reference electrode. Further, an ITO (tin oxide-doped indium oxide) glass substrate to which a ruthenium bipyridyl complex is fixed is used as the substrate. The ruthenium bipyridyl complex is fixed by coating the surface of the ITO glass substrate with aminosilane beforehand and making ruthenium bipyridyl complex labeled molecules (bis(2,2'-bipyridine)-4'-methyl-4-carboxybipyridine-ruthenium N-succinimidyl ester-bis(hexafluorophosphate)) made by Sigma-Aldrich) react over the surface.

Further, a phosphoric acid buffer (pH 6.8) in which TPrA of 180 mM is dissolved as a reaction aid is put into a very small container; the counter electrode, the reference electrode, and the ITO glass substrate are immersed; further the platinum microelectrode is inserted into the solution; and the insertion position is controlled with the SECM. A through hole of about 3 mm in diameter is formed at the bottom of the very small container, the solution is prevented from leaking with an O-ring, and the very small container is placed over a specimen table of an inverted microscope. ECL passes through the hole and is collected with an objective lens (×4) and then a luminescent image is obtained with the EM-CCD (9100-13 made by Hamamatsu Photonics K.K.). When the platinum microelectrode is brought close to the ITO substrate while electric current is monitored and the electrode touches the ITO substrate, the area of the electrode increases extremely and hence spiky increase of electric current is observed. The electrode position is defined as a standard (distance 0 (zero)). The electrode position is changed so that the distance from the substrate may be 0.1 µm, 0.2 µm, 0.3 µm, 0.5 µm, 0.7 µm, 1.0 µm, 1.5 µm, 2.0 µm, and 2.8 µm, further the voltage is swept from 0 V to 1.4 V, and ECL images on those occasions are obtained.

Figure 7:
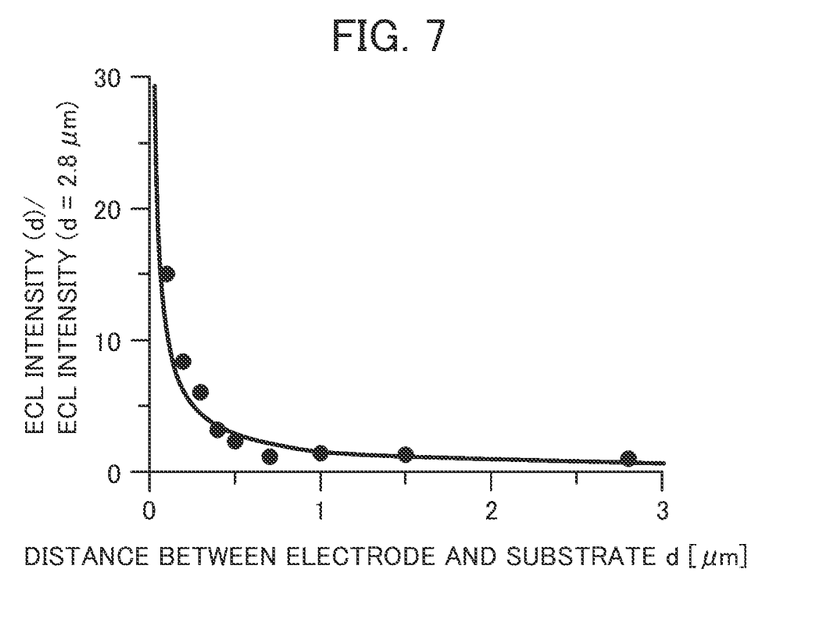
FIG. 7 is a graph showing a relationship between a distance between a luminescence unit fixed substrate and an electrode and an ECL intensity.

FIG. 7 is a graph showing a relationship between a distance between a ruthenium complex fixed substrate and an electrode and an ECL intensity.

In FIG. 7, an ECL intensity is shown by being standardized with the ECL intensity at a distance of 2.8 µm. In this verification, it is verified that, as the position of an electrode comes close to an ITO substrate, an ECL image shines brightly in response to the voltage sweep. In FIG. 7, it is obvious that the ECL intensity increases rapidly when the distance between the substrate and the electrode is 1 µm or less similarly to the relationship between the diameter of the magnetic moicroparticle and the ECL intensity shown in FIG. 6. Further, it is obvious that the rate of the increase matches very well with the case shown in FIG. 6.

As stated above, the relationship between a diameter of a magnetic microparticle and an ECL intensity and the relationship between a distance between a ruthenium complex and an electrode and an ECL intensity are correlated very well. Further, it is found that the relationship is entirely different from a result estimated through prior art. Thus, these results show that ECL occurs under a different mechanism when a ruthenium complex is located at a position close (<1 µm) to or far (>1 µm) from an electrode. Moreover, it is considered that a factor of improving an ECL intensity when a ruthenium complex is located at a position close (<1 µm) to an electrode is that the quantity of a radical species existing in the vicinity of the electrode is large. Meanwhile, the lifetime of a radical species is considered to be very short because an ECL intensity lowers (in other words, the effect of a radical species disappears) at a position far from an electrode.

Given that radical species generated over an electrode are dispersed by diffusion, a distance d to reach at a diffusion coefficient D and a time t is given by the following Expression 1.

$$t = d2/(36D)$$ Expression 1

Figure 8:
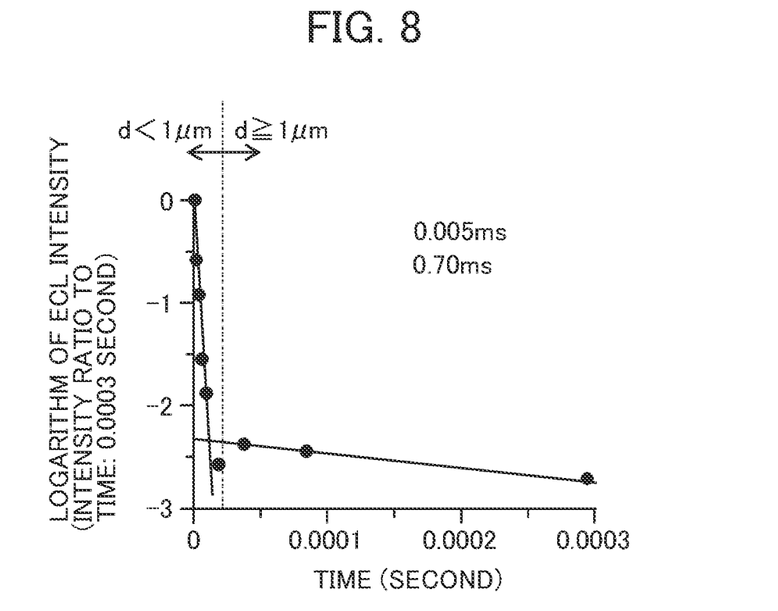
FIG. 8 is a graph showing a relationship between the radicals travelling time and an ECL intensity.

FIG. 8 is a graph showing a relationship between a time elapsed since the generation of a radical species and an ECL intensity.

In FIG. 8, the diffusion coefficient D is set at $5 \times 10^{-6}$ (cm$^2$/s), the distance d is converted to an arrival time, the ECL intensity is standardized by a maximum value, and then logarithm is taken. In FIG. 8, it is obvious that there are two components, a long-lived component and a short-lived component. The half-life time of the long-lived component (region where an arrival distance is 1 µm or more) is 0.3 to 0.7 ms. The half-life time is a value very close to the lifetime (0.2 ms) of a cation radical of TPrA determined by electron spin resonance in prior art. In contrast, the lifetime of the short-lived component is about 5 µs and it is obvious that a radical species of a short lifetime is involved.

Further, if a potential of generating a maximum ECL intensity is examined, the potential is about 1.4 V (relative to Ag/AgCl) and the radical species generated at the potential is considered to be generated by the oxidation reaction of TPrA. The elementary process of reaction of a cation radical species in an aliphatic amine has long been known since old times, for example breakage of a bond between a carbon atom and a nitrogen atom occurs from a cation radical generated by oxidation reaction over an electrode, and the generated neutral radical (unpaired electrons are localized to the nitrogen atom) has a very short lifetime (refer to Journal of American Chemical Society 34, (1969), pp 1821-1826 and the like, for example). Moreover, the neutral radical abstracts a proton from another aliphatic amine molecule and a neutral radical (unpaired electrons are localized to the α carbon atom) of the other aliphatic amine molecule is generated. Resultantly, the neutral radical (unpaired electrons are localized to the α carbon atom) of TPrA is generated and hence a radical species indispensable for producing an exited state (refer to FIG. 2) of a ruthenium complex is generated more in a new reaction process (hereunder referred to as second reaction process) different from a reaction process (hereunder referred to as first reaction process) in the basic principle. Since the neutral radical (unpaired electrons are localized to the nitrogen atom) of an intermediate product has a very short lifetime, the new reaction process (second reaction process) is considered to work effectively only in the vicinity of an electrode.

Figure 9:
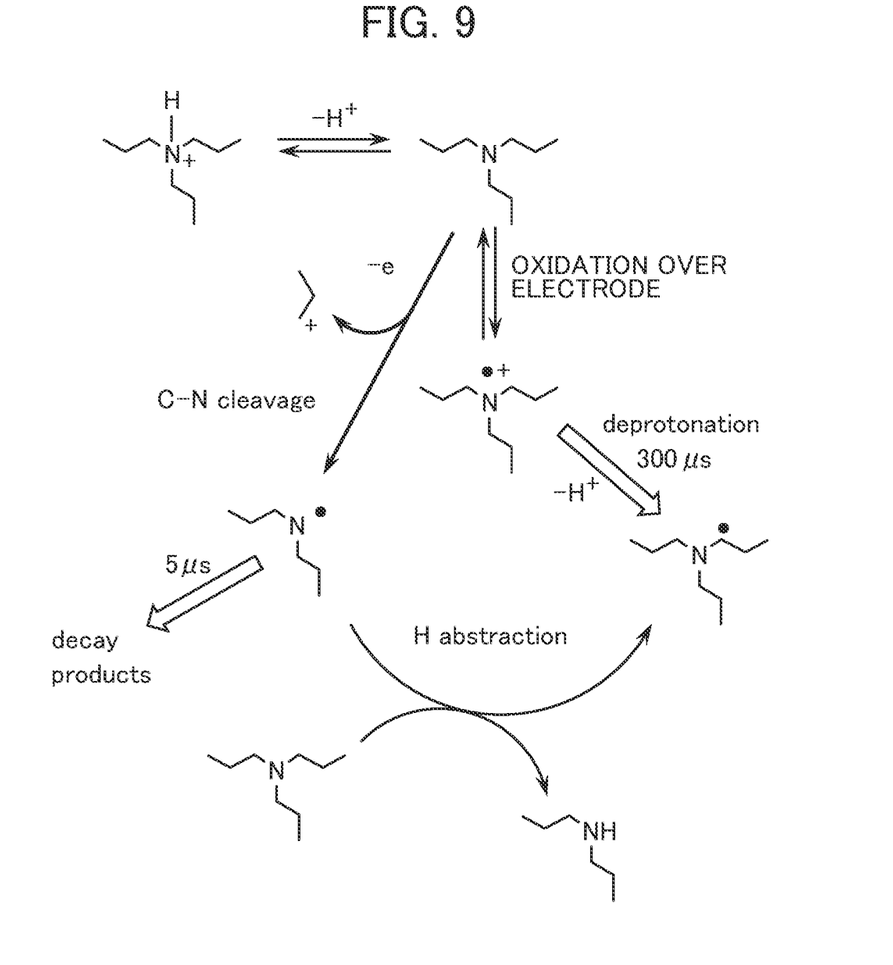
FIG. 9 is a view explaining a reaction process of electrochemiluminescence according to First Embodiment.

FIG. 9 is a view explaining a reaction process of electrochemiluminescence according to the present embodiment.

In a region near an electrode, a neutral radical is produced not only through a first reaction process of abstracting a proton from a cation radical of TPrA and producing a neutral radical (unpaired electrons are localized to an α carbon atom) but also through a second reaction process of cutting a C—N bond along with oxidation over the electrode, producing a neutral radical (unpaired electrons are localized to a nitrogen atom), and producing a neutral radical (unpaired electrons are localized to an α carbon atom) by abstracting hydrogen from another aliphatic amine molecule and hence an exited state of a ruthenium complex is formed at a higher efficiency and an ECL intensity increases.

The ECL mechanism in the second reaction process works effectively and an ECL intensity increases significantly as long as the diameter of a magnetic microparticle is 1 µm or less (more desirably 0.5 µm or less in diameter). In other words, by using a magnetic microparticle 1 µm or less in diameter (more desirably 0.5 µm or less in diameter), ECL is generated through the new reaction process and hence high sensitivity can be achieved. Further, detection sensitivity can be adjusted by adjusting the particle size of a used magnetic microparticle. It is therefore possible to make analysis with an optimum sensitivity by using magnetic particles having at least two kinds of particle sizes as a support and selecting a magnetic particle used in accordance with the kind of a test object.

Second Embodiment

Figure 10:
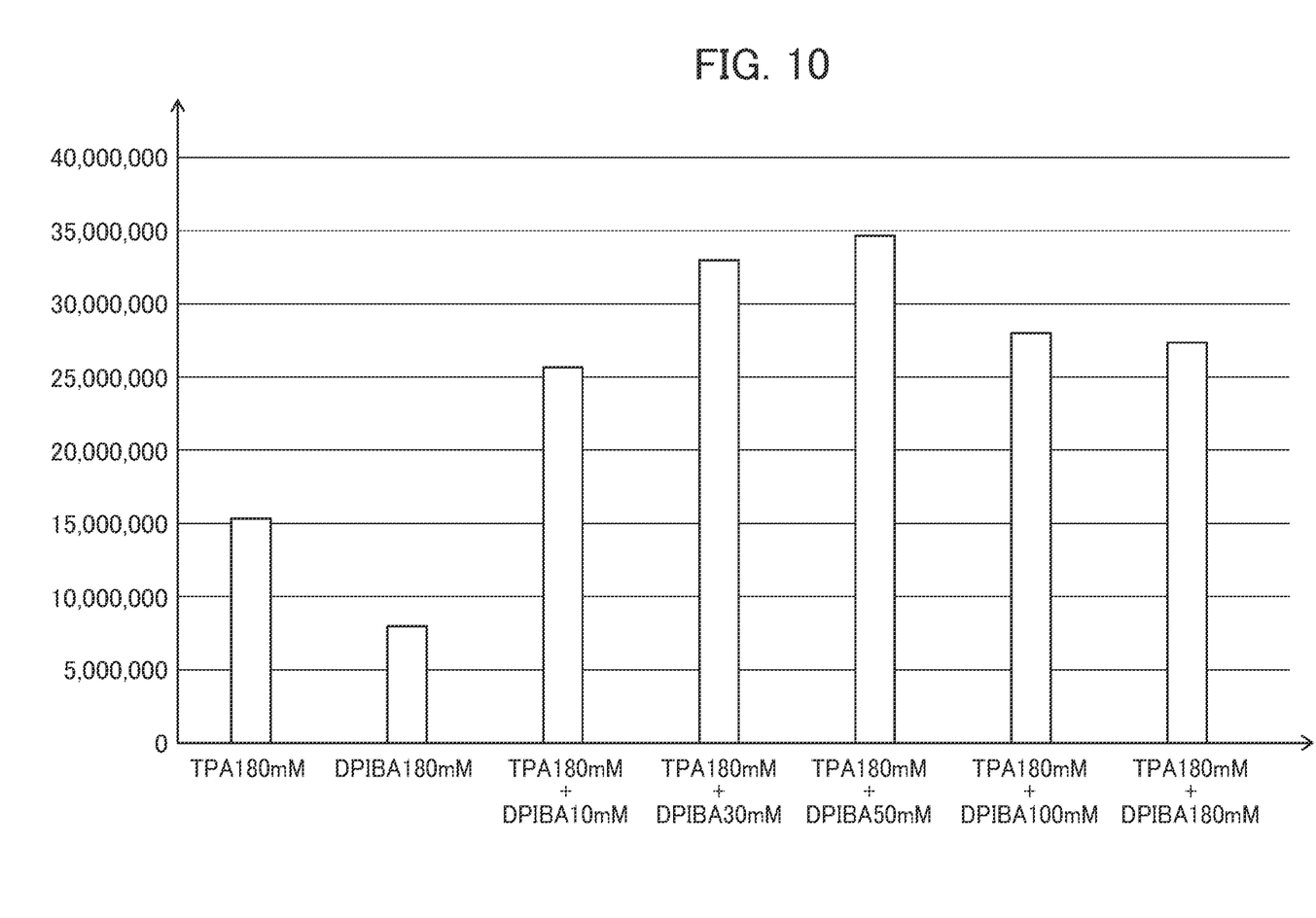
FIG. 10 is a graph showing an ECL intensity enhancement when the quantity of a second amine compound added to a first amine compound is changed.

Second Embodiment is explained hereunder in detail in reference to FIG. 10.

The present embodiment is, in view of the concern that it takes time to collect magnetism and that a throughput lowers when a magnetic microparticle with small diameter is used as shown in First Embodiment, a method of increasing detection sensitivity by way of a new reaction process (hereunder referred to as third reaction process) conforming to the second reaction process by adding a specific amine compound (hereunder referred to as second reaction aid or second amine compound) that is different from the reaction aid (hereunder referred to as first reaction aid or first amine compound) in the first reaction process even when a magnetic microparticle of 1 µm or more (more desirably about 2.8 µm) in diameter that is easily handled is used as a magnetic microparticle.

In the present embodiment, specifically, an amine compound (aliphatic amine) where C—N bond cleavage is induced by electrochemical oxidation is added as a second amine compound in a solution. By adding the second amine compound, a secondary amine radical that has lost an alkyl group is formed, the secondary amine radical abstracts hydrogen from an amine of a first reaction aid, and a neutral radical of the first reaction aid is produced (hereunder referred to as third reaction process). In other words, a neutral radical is formed through the third reaction process in addition to the first reaction process of forming the neutral radical by way of the cation radical of the amine of the first reaction aid oxidized over an electrode.

In this way, the present embodiment, by being configured so as to go through a second reaction process in addition to a first reaction process, can obtain the effects of (1) increasing the quantity of a produced neutral radical species, (2) increasing the generation rate of a neutral radical more in the second reaction process than in the first reaction process, and (3) being able to form a neutral radical species of a first reaction aid while the quantity of a cation radical is maintained because it does not go through the cation radical of the first reaction aid that is indispensable for ECL. In other words, by adding a second amine compound, the quantity of ECL can be increased remarkably.

Here, conditions necessary for a second amine compound are that a C—N bond cleavage is induced by the electrochemical oxidation and the stability of a carbocation formed after the C—N bond cleavage is ensured. To that end, the second amine compound preferably has a structure suitable for delocalization of a charge and has an unsaturated bond. In other words, as a second amine compound (second reaction aid), 1-allylpiperidine or 1-allyl pyrrolidine is named for example.

Further, as a structure advantageous to the stability of a carbocation, a structure of containing a hydroxyl group or a halogen group in a dissociating carbon chain is desirable.

Furthermore, conditions necessary for a second amine compound are that the second amine compound is likely to oxidize over an electrode and a low energy highest occupied molecular orbital (HOMO) is advantageous. To that end, an amine having a branch structure is desirable. That is, as a second amine compound (second reaction aid), named for example is diisobutyl-isobutylamine, diisobutyl-propylamine, N,N-dipropyl-N-(secobutyl)amine, or N,N-di(secobutyl)-N-propylamine.

Here, as a first amine compound (first reaction aid), TPrA showing a high luminescence intensity is preferably used and, as an aliphatic amine, an aliphatic amine such as a first, second, or third alkylamine in which each alkyl group has a carbon atom number of 1 to 4 or a substituted aliphatic amine may be used. Specifically, as a first amine compound, used for example may be triethanolamine, triethylamine, 1,4-diazabicyclo(2,2,2)-octane, 1-piperidine ethanol, 1,4-piperazine-bis-(ethane-sulfonic acid), or triisopropylamine.

FIG. 10 is a graph showing an ECL intensity changing when the quantity of a second amine compound added to a first amine compound is changed. In FIG. 10, TPrA is used as the first amine compound, dipropyl-isobutylamine (DPIBA) is used as the second amine compound, and an ECL intensity is measured while the mixing ratio is changed.

As shown in FIG. 10, in comparison with the case of TPrA only (180 mM), the ECL intensity increases as DPIBA is added more and shows the highest value (maximum value) when the quantity of the added DPIBA is 50 mM. Then, as the quantity of the added DPIBA is further increased, the ECL intensity turns to reduce.

Further, in the case of DPIBA only (180 mM), the ECL intensity is extremely weak and hence the function as a reaction aid is estimated to be very low when only DPIBA is used.

Meanwhile, the ECL intensity increases dramatically by adding an amine compound (DPIBA 10 mM) that has a low reaction support function alone to TPrA (180 mM). It is therefore estimated that, by adding DPIBA to TPrA, the ECL intensity increases because the TPrA neutral radical formation caused during a third reaction process conforming to a second reaction process contributes largely in addition to the reaction of TPrA alone.

Further, it is estimated that, if DPIBA of 50 mM or more is added, the oxidation reaction of TPrA and the oxidation reaction of DPIBA occur competitively, resultantly the influence of DPIBA that works poorly as a reaction aid appears undesirably during the reaction process, and the ECL intensity finally reduces.

As stated above, by using at least two kinds of aliphatic amines, that is, an aliphatic amine (first reaction aid) that has only a linear alkyl chain and is represented by TPrA and an aliphatic amine (second reaction aid) that causes a nitrogen-carbon bond to dissociate in succession to oxidation reaction over an electrode and is represented by DPIBA, as reaction aids, it is possible to increase the luminescence intensity of ECL remarkably and achieve a higher sensitivity.

Further, detection sensitivity can be adjusted by adjusting the content ratio of at least two kinds of aliphatic amines, that is, an aliphatic amine (first reaction aid) that has only a linear alkyl chain and an aliphatic amine (second reaction aid) that causes a nitrogen-carbon bond to dissociate in succession to oxidation reaction over an electrode, in accordance with the kind of a test object and hence analysis can be performed with a sensitivity optimum to detection.

<Additional Remark>

Here, the present invention is not limited to the aforementioned embodiments and includes various modified examples and combinations within a range not deviating from the tenor of the present invention. Further, the present invention is not limited to the cases having all the configurations explained in the aforementioned embodiments and includes the cases of partially excluding the configurations. Furthermore, the above configurations and functions may also be achieved by designing a part or the all of them with an integrated circuit or the like for example. In addition, the above configurations and functions may also be achieved with software by interpreting and implementing programs through which processors perform respective functions.

LIST OF REFERENCE SIGNS

101 . . . Flow cell
102 . . . Working electrode
103 . . . Counter electrode
104 . . . Reference electrode
105 . . . Controller
106 . . . Magnetic beads (Magnetic support)
107 . . . Magnet (Magnetic force generator)
108 . . . Magnet position controller
109 . . . Electrochemiluminescence detector
110 . . . Flow channel

The invention claimed is:

1. A biomolecular analysis method comprising:
an inflow process of causing a solution to flow in a flow cell, the solution containing a test object, a magnetic support on the surface of which a complex including an antibody that is labeled with a luminescent agent and recognizes the test object is formed, and a reaction aid to assist reaction of the luminescent agent;
a capture process of capturing the magnetic support over a working electrode by a magnetic field generated by a magnetic force generator;
a luminescent process of making the luminescent agent illuminate by applying a voltage to the working electrode; and
a measurement process of measuring an amount of luminescence of the luminescent agent,
wherein the solution contains a first neutral radical that is produced from the reaction aid through a cation radical and acts on luminescence of the luminescent agent, and a second neutral radical that is produced not through a cation radical and acts on luminescence of the luminescent agent, and
wherein the solution contains at least two kinds of aliphatic amines comprising a first aliphatic amine and a second aliphatic amine, and
wherein the first neutral radical is produced by the first aliphatic amine that is contained in the solution and has only a linear alkyl chain, and the second neutral radical is produced by the second aliphatic amine that causes a nitrogen-carbon bond to dissociate in succession to oxidation reaction over the working electrode.

2. A biomolecular analysis method according to claim 1, wherein the second aliphatic amine has at least an alkyl chain having a branch structure.

3. A biomolecular analysis method according to claim 1, wherein the second aliphatic amine has an unsaturated bond in an alkyl chain.

4. A biomolecular analysis method according to claim 1, wherein the second aliphatic amine has a hydroxyl group and a halogen atom in an alkyl chain.

5. A biomolecular analysis method according to claim 1, wherein the first aliphatic amine is tripropylamine.

6. A biomolecular analysis method according to claim 1, wherein the second aliphatic amine is dipropyl isobutylamine.

7. A biomolecular analysis method according to claim 1, wherein the second aliphatic amine is diisopropyl ethylamine.

8. A biomolecular analysis method according to claim 1, wherein the magnetic support is magnetic particles of 1 micron or less in diameter.

9. A biomolecular analysis method according to claim 8, wherein the magnetic particles are selected from magnetic particles having at least two kinds of particle sizes in accordance with a kind of the test object.

10. A biomolecular analysis method according to claim 1, wherein a content ratio of the first aliphatic amine and the second aliphatic amine is adjusted in accordance with a kind of the test object.

11. A biomolecular analyzer comprising:
a flow cell;
a working electrode, a counter electrode, and a reference electrode which are arranged in the interior of the flow cell;
a solution comprising a magnetic support over the surface of which a complex including an antibody that is labeled with a luminescent agent and recognizes a test object is formed, and a reaction aid to assist reaction of the luminescent agent; and
a controller configured to: cause the solution to flow in the flow cell with the test object;
capture the magnetic support over the working electrode by causing a magnetic field to be generated by a magnetic force generator;
cause the luminescent agent to illuminate by applying a voltage to the working electrode; and
measure an amount of luminescence of the luminescent agent with a measuring device,
wherein the solution contains a first neutral radical that is produced from the reaction aid through a cation radical and acts on luminescence of the luminescent agent, and a second neutral radical that is produced not through a cation radical and acts on luminescence of the luminescent agent, and
wherein the solution contains at least two kinds of aliphatic amines comprising
a first aliphatic amine and a second aliphatic amine, and wherein the first neutral radical is produced by the first aliphatic amine that is contained in the solution and has only a linear alkyl chain, and the second neutral radical is produced by the second aliphatic amine that causes a nitrogen-carbon bond to dissociate in succession to oxidation reaction over the working electrode.

12. The biomolecular analysis method of claim 1, wherein a ratio the first aliphatic amine to the second aliphatic amine is between 1:(1/18) and 1:1.

13. The biomolecular analyzer of claim 11, wherein a ratio the first aliphatic amine to the second aliphatic amine is between 1:(1/18) and 1:1.

* * * * *